US011359158B2

(12) United States Patent
Yanagihara et al.

(10) Patent No.: US 11,359,158 B2
(45) Date of Patent: Jun. 14, 2022

(54) LUBRICATING OIL COMPOSITION, LUBRICATION METHOD, AND TRANSMISSION

(71) Applicant: IDEMITSU KOSAN CO., LTD., Chiyoda-ku (JP)

(72) Inventors: Takashi Yanagihara, Ichihara (JP); Daichi Ogawa, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 13 days.

(21) Appl. No.: 16/318,497

(22) PCT Filed: Sep. 19, 2017

(86) PCT No.: PCT/JP2017/033653
§ 371 (c)(1),
(2) Date: Jan. 17, 2019

(87) PCT Pub. No.: WO2018/074128
PCT Pub. Date: Apr. 26, 2018

(65) Prior Publication Data
US 2019/0316058 A1 Oct. 17, 2019

(30) Foreign Application Priority Data

Oct. 19, 2016 (JP) .............................. JP2016-205147

(51) Int. Cl.
| | | |
|---|---|---|
| *C10M 133/16* | (2006.01) | |
| *C10M 141/10* | (2006.01) | |
| *C10M 135/10* | (2006.01) | |
| *C10M 137/02* | (2006.01) | |
| *C10M 137/04* | (2006.01) | |
| *C10M 169/04* | (2006.01) | |
| *F16H 57/04* | (2010.01) | |
| *C10N 30/04* | (2006.01) | |
| *C10N 40/04* | (2006.01) | |

(52) U.S. Cl.
CPC ........ *C10M 141/10* (2013.01); *C10M 133/16* (2013.01); *C10M 135/10* (2013.01); *C10M 137/02* (2013.01); *C10M 137/04* (2013.01); *C10M 169/04* (2013.01); *F16H 57/04* (2013.01); *C10M 2203/003* (2013.01); *C10M 2215/28* (2013.01); *C10M 2219/044* (2013.01); *C10M 2223/04* (2013.01); *C10M 2223/049* (2013.01); *C10N 2030/04* (2013.01); *C10N 2040/045* (2020.05)

(58) Field of Classification Search
CPC ........ C10M 2215/082; C10M 2215/28; C10M 133/16; C12N 2040/04; C12N 2040/042; C12N 2040/045; C12N 2040/046
USPC ............................................... 508/551, 555
See application file for complete search history.

(56) References Cited

U.S. PATENT DOCUMENTS

| | | | | |
|---|---|---|---|---|
| 4,512,903 A | * | 4/1985 | Schlicht .................. | C10L 10/08 508/555 |
| 8,530,395 B1 | | 9/2013 | Barton et al. | |
| 10,920,162 B2 | * | 2/2021 | Narita .................. | C10M 169/04 |
| 2005/0130854 A1 | * | 6/2005 | Yagishita .............. | C10M 163/00 508/376 |
| 2007/0179068 A1 | | 8/2007 | Shiga et al. | |
| 2009/0312207 A1 | * | 12/2009 | Bartley ................ | C10M 141/10 508/161 |
| 2010/0144565 A1 | * | 6/2010 | Ikeda ................... | C10M 163/00 508/151 |
| 2012/0202726 A1 | | 8/2012 | Barton et al. | |
| 2012/0283158 A1 | * | 11/2012 | Mullay ................ | C10M 141/10 508/186 |
| 2013/0005632 A1 | | 1/2013 | Kurosawa et al. | |
| 2013/0157914 A1 | | 6/2013 | Barton et al. | |
| 2013/0296208 A1 | | 11/2013 | Barton et al. | |
| 2013/0303417 A1 | | 11/2013 | Barton et al. | |
| 2014/0031268 A1 | | 1/2014 | Sumiejski et al. | |
| 2015/0018256 A1 | | 1/2015 | Komatsubara | |
| 2015/0038385 A1 | | 2/2015 | Barton et al. | |
| 2016/0340603 A1 | * | 11/2016 | Takahashi ............... | F16H 48/38 |
| 2017/0198234 A1 | * | 7/2017 | Matsuki ............... | C10M 141/10 |
| 2017/0240836 A1 | * | 8/2017 | Saccomando ........ | C10M 141/10 |
| 2017/0335224 A1 | * | 11/2017 | Abraham ............. | C10M 137/04 |
| 2019/0010417 A1 | * | 1/2019 | Yanagihara .......... | C10M 141/10 |

FOREIGN PATENT DOCUMENTS

| | | |
|---|---|---|
| CN | 1681910 A | 10/2005 |
| EP | 2 548 938 A1 | 1/2013 |
| JP | 2001-288488 A | 10/2001 |
| JP | 2007-169570 A | 7/2007 |
| JP | 2009-511716 A | 3/2009 |
| JP | 2009-167337 A | 7/2009 |
| JP | WO 2011/037054 A1 | 3/2011 |
| JP | 2013-189565 A | 9/2013 |
| JP | 2014-501326 A | 1/2014 |
| WO | WO 2007/044820 A1 | 4/2007 |
| WO | WO 2008/076825 A1 | 6/2008 |
| WO | WO 2011/022317 A1 | 2/2011 |
| WO | WO 2012/094275 A1 | 7/2012 |
| WO | WO 2012/112648 A2 | 8/2012 |

(Continued)

OTHER PUBLICATIONS

International Search Report dated Nov. 7, 2017 in PCT/JP2017/033653 filed Sep. 19, 2017.

(Continued)

*Primary Examiner* — Ellen M McAvoy
(74) *Attorney, Agent, or Firm* — Oblon, McClelland, Maier & Neustadt, L.L.P.

(57) ABSTRACT

Provided are a lubricating oil composition containing (A) a specific amide compound and (B) a metal-based detergent, wherein the content of the metal-based detergent (B) as converted in terms of metal atom is, based on the total amount of the composition, more than 300 ppm by mass and 1,000 ppm by mass or less, and having a high intermetallic friction coefficient and excellent clutch anti-shudder performance; and a lubrication method and a transmission using the composition.

10 Claims, No Drawings

(56) References Cited

FOREIGN PATENT DOCUMENTS

| | | |
|---|---|---|
| WO | WO 2013/145414 A1 | 10/2013 |
| WO | WO 2016/158999 A1 | 10/2016 |
| WO | WO 2017/159363 A1 | 9/2017 |

OTHER PUBLICATIONS

Extended European Search Report dated May 26, 2020 in European Patent Application No. 17861817.9, 8 pages.
Office Action dated Jun. 22, 2021, in CN Application No. 201780044166.5, 10 pages.

* cited by examiner

LUBRICATING OIL COMPOSITION, LUBRICATION METHOD, AND TRANSMISSION

TECHNICAL FIELD

The present invention relates to a lubricating oil composition, and to a lubrication method and a transmission using the lubricating oil composition.

BACKGROUND ART

As transmissions for use in automobiles, manual transmissions, automatic transmissions, continuously variable transmissions and the like are now placed on the market, and special attention is paid to continuously variable transmissions for the reason that they can continuously change gear and are therefore free from gear shift shock and from dropping down of engine revolutions in shifting up, and can therefore improve acceleration performance. As continuously variable transmissions, metal belt-type ones, chain-type ones, toroidal-type ones and the like have been developed, and these require high-capacity power transmission by the friction coefficient between a belt or a chain and a pulley. Consequently, a lubricating oil composition for use for continuously variable transmissions is required to have an intermetallic friction coefficient on a predetermined level or more.

These days further sophistication of continuously variable transmissions is being advanced, and those mounted with a lock-up clutch-attached torque converter have been developed as a starting device. A torque converter transmits power while absorbing the differential rotation through stirring of a lubricating oil composition, and in any other than starting, the torque converter directly transmits power via a rock-up clutch to reduce energy loss. For rock-up clutch control, direct fastening may be combined with slip control for power transmission with slipping, and in such a case where the frictional properties of a lubricating oil composition are unsuitable, there may occur self-excited vibration called shudder. Accordingly, a lubricating oil composition is required to have clutch anti-shudder performance of both initial clutch anti-shudder performance and long-term clutch anti-shudder lifetime (hereinafter initial clutch anti-shudder performance and clutch anti-shudder lifetime are combined and referred to as "clutch anti-shudder performance").

As a lubricating oil composition which is used in transmissions and is focused on the improvement of the intermetallic friction coefficient thereof, for example, a lubricating oil composition prepared by blending (A) a phosphorus containing compound having a hydrocarbon group having 1 to 8 carbon atoms and (B) a tertiary amine compound having, as a substituent, a hydrocarbon group having 6 to 10 carbon atoms in a base oil has been proposed (see PTL 1).

On the other hand, as a lubricating oil composition which is used in transmissions and is focused on the improvement of the intermetallic friction coefficient and the clutch anti-shudder lifetime thereof, for example, there have been proposed a lubricating oil composition containing, in a lubricant base oil, (a) an alkaline earth metal sulfonate or phenate, (b) an imide compound and (c) a phosphorus compound (see PTL 2); a lubricating oil composition prepared by blending (A) a tertiary amine having a specific structure, (B) at least one of an acid phosphate and an acid phosphite, and (C) at least any one of a metal sulfonate, a metal phenate and a metal salicylate in a lubricant base oil (see PTL 3); and a lubricating oil composition prepared by blending (A) a primary amine, (B) a tertiary amine, (C) at least any one of a metal sulfonate, a metal phenate and a metal salicylate and (D) at least any one of an acid phosphate and an acid phosphite in a lubricant base oil (see PTL 4).

CITATION LIST

Patent Literature

PTL 1: JP 2009-167337 A
PTL 2: JP 2001-288488 A
PTL 3: WO2011/037054
PTL 4: JP 2013-189565 A

SUMMARY OF INVENTION

Technical Problem

However, in PTL 1, nothing is discussed relating to the clutch anti-shudder performance of the lubricating oil composition described therein. Though the lubricating oil compositions described in PTLs 2 to 4 are attempted to improve the intermetallic friction coefficient and the clutch anti-shudder performance thereof, nothing is still discussed therein relating to the clutch anti-shudder performance including initial clutch anti-shudder performance and clutch anti-shudder lifetime thereof. Even the lubricating oil compositions described in PTLs 2 to 4 whose clutch anti-shudder lifetime is discussed therein could not still satisfy recent severe requirements for clutch anti-shudder lifetime of the compositions, and the lubricating oil compositions described in PTLs 1 to 4 could not be said to satisfy both a high intermetallic friction coefficient and excellent clutch anti-shudder performance. In particular, for the clutch anti-shudder performance including initial clutch anti-shudder performance and clutch anti-shudder lifetime, recently, severe standards have become required, and development of a lubricating oil composition capable of satisfying such severe requirements is desired.

The present invention has been made in consideration of the above-mentioned situation, and objects thereof are to provide a lubricating oil composition having a high intermetallic friction coefficient and excellent clutch anti-shudder performance, and to provide a lubrication method and a transmission using the lubricating oil composition.

Solution to Problem

As a result of assiduous studies, the present inventors have found that the present invention mentioned below can solve the above-mentioned problems. Specifically, the present invention provides a lubricating oil composition having the constitution mentioned below, and a lubrication method and a transmission using the lubricating oil composition.

1. A lubricating oil composition containing (A) an amide compound represented by the following general formula (I), and (B) a metal-based detergent, wherein the content of the metal-based detergent (B) as converted in terms of metal atom is, based on the total amount of the composition, more than 300 ppm by mass and 1,000 ppm by mass or less:

wherein $R^{11}$ represents a hydrocarbon group having 6 or more carbon atoms, $R^{12}$ represents a hydrogen atom or a hydrocarbon group having 1 or more and 5 or less carbon atoms, $R^{13}$ represents a hydroxyalkyl group having 1 or more and 6 or less carbon atoms, or a group formed through condensation of the hydroxyalkyl group with an acylating agent, and X represents an oxygen atom or a sulfur atom.

2. A lubrication method, including using the lubricating oil composition of the above 1.

3. A transmission including the lubricating oil composition of the above 1.

Advantageous Effects of Invention

According to the present invention, there can be provided a lubricating oil composition having a high intermetallic friction coefficient and excellent clutch anti-shudder performance, and a lubrication method and a transmission using the lubricating oil composition.

DESCRIPTION OF EMBODIMENTS

Hereinunder, embodiments of the present invention (also referred to as the present embodiment) are described. In this description, the numerical values relating to "or more" and "or less" may be combined in any manner.

[Lubricating Oil Composition]

The lubricating oil composition of the present embodiment contains (A) an amide compound having a specific structure and (B) a metal-based detergent, wherein the content of the metal-based detergent (B) as converted in terms of metal atom is, based on the total amount of the composition, more than 300 ppm by mass and 1,000 ppm by mass or less.

<(A) Amide Compound>

The amide compound (A) is used in combination with the metal-based detergent (B) to be mentioned below to thereby enable the lubricating oil composition of the present embodiment to have a high intermetallic friction coefficient and excellent clutch anti-shudder performance, and is represented by the following general formula (1).

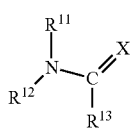

(1)

In the general formula (1), $R^{11}$ represents a hydrocarbon group having 6 or more carbon atoms. The hydrocarbon group may be linear, branched or cyclic and examples thereof include an alkyl group, an alkenyl group, an alkadiene group, a cycloalkyl group, an aryl group and an arylalkyl group. Among these hydrocarbon groups, an alkyl group, an alkenyl group and an alkadiene group are preferred, and from the viewpoint of especially enhancing the stability of the amide compound to attain a more excellent addition effect, an alkyl group is more preferred.

The carbon number of the hydrocarbon group needs to be 6 or more. When the carbon number is less than 6, a high intermetallic friction coefficient and excellent clutch anti-shudder performance could not be obtained. From the viewpoint of improving the intermetallic friction coefficient and the clutch anti-shudder performance, the carbon number is preferably 8 or more, more preferably 12 or more, even more preferably 16 or more. The upper limit of the carbon number is preferably 24 or less, more preferably 22 or less, even more preferably 20 or less.

The alkyl group includes various hexyl groups ("various" is meant to include linear and branched ones and isomers thereof, and the same shall apply hereinunder), various heptyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, various octadecyl groups, various nonadecyl groups, various eicosyl groups, various heneicosyl groups, various docosyl groups, various tricosyl groups, and various tetracosyl groups.

The alkenyl group includes various hexenyl groups, various heptenyl groups, various octenyl groups, various nonenyl groups, various decenyl groups, various undecenyl groups, various dodecenyl groups, various tridecenyl groups, various tetradecenyl groups, various pentadecenyl groups, various hexadecenyl groups, various heptadecenyl groups, various octadecenyl groups, various nonadecenyl groups, various eicosenyl groups, various heneicosenyl groups, various docosenyl groups, various tricosenyl groups and various tetracosenyl groups.

Examples of the alkadiene group include various hexadiene groups, various heptadiene groups, various octadiene groups, various nonadiene groups, various decadiene groups, various undecadiene groups, various dodecadiene groups, various tridecadiene groups, various tetradecadiene groups, various pentadecadiene groups, various hexadecadiene groups, various heptadecadiene groups, various octadecadiene groups, various nonadecadiene groups, various eicosadiene groups, various heneicosadiene groups, various docosadiene groups, various tricosadiene groups, and various tetracosadiene groups.

Examples of the cycloalkyl group include a cyclohexyl group, various methylcyclohexyl groups, various ethylcyclohexyl groups, and various dimethylcyclohexyl groups; examples of the aryl group include a phenyl group, various methylphenyl groups, various ethylphenyl groups, various dimethylphenyl groups, various propylphenyl groups, various trimethylphenyl groups, various butylphenyl groups, and various naphthyl groups; examples of the arylalkyl group include a benzyl group, a phenethyl group, various phenylpropyl groups, various phenylbutyl groups, various methylbenzyl groups, various ethylbenzyl groups, various propylbenzyl groups, various butylbenzyl groups, and various hexylbenzyl groups.

$R^{12}$ represents a hydrogen atom or a hydrocarbon group having 1 or more and 5 or less carbon atoms. The hydrocarbon group may be linear, branched or cyclic, and examples thereof include an alkyl group, an alkenyl group, an alkadiene group and a cycloalkyl group. Among these hydrocarbon groups, an alkyl group, an alkenyl group and an alkadiene group are preferred, and from the viewpoint of especially increasing the stability of the amide compound and attaining a more excellent addition effect, an alkyl group is more preferred.

The carbon number of the hydrocarbon group needs to be 1 or more and 5 or less. When the carbon number is not 1 or more and 5 or less, a high intermetallic friction coefficient and excellent clutch anti-shudder performance could not be obtained. From the viewpoint of improving the intermetallic friction coefficient and the clutch anti-shudder performance, the carbon number is preferably 4 or less, more preferably 3 or less, even more preferably 2 or less, and the lower limit may be 1 or more.

The alkyl group includes a methyl group, an ethyl group, various propyl groups, various butyl groups and various pentyl groups; the alkenyl group includes a vinyl group, various propenyl groups, various butadienyl groups, and various pentenyl groups; and examples of the alkadiene group include a propadiene group, various butadiene groups and various pentadiene groups.

The cycloalkyl group includes a cyclopropyl group, various methylcyclopropyl groups, various ethylcyclopropyl groups, various dimethylcyclopropyl groups, various diethylcyclopropyl groups, a cyclobutyl group, various methylcyclobutyl groups, and a cyclopentyl group.

$R^{12}$ is, from the viewpoint of improving intermetallic friction coefficient and clutch anti-shudder performance, preferably a hydrogen atom, or an alkyl group, an alkenyl group or an alkadiene group having 1 or more and 5 or less carbon atoms, more preferably a hydrogen atom or an alkyl group having 1 or more and 5 or less carbon atoms, even more preferably a hydrogen atom or an alkyl group having 1 or more and 3 or less carbon atoms, and especially preferably a hydrogen atom.

The hydroxyalkyl group having 1 or more and 6 or less carbon atoms of $R^{13}$ includes a hydroxymethyl group, a hydroxyethyl group, various hydroxypropyl groups, various hydroxybutyl groups, various hydroxypentyl groups, and various hydroxyhexyl groups. The alkyl group contained in the hydroxyalkyl group may be linear, branched or cyclic. Among these, from the viewpoint of improving intermetallic friction coefficient and clutch anti-shudder performance, the carbon number is preferably 5 or less, more preferably 4 or less, even more preferably 2 or less, and the lower limit may be 1 or more.

$R^{13}$ may also be a group to be formed through condensation of a hydroxyalkyl group with an acylating agent. The acylating agent includes carboxylic acid compounds such as carboxylic acids such as formic acid, acetic acid, succinic acid, and salicylic acid, halides thereof, and anhydrides thereof, and thiocarboxylic acid compounds such as thiocarboxylic acids such as thioacetic acid, thiopropionic acid and phenylthioacetic acid, and anhydrides thereof.

From the viewpoint of improving intermetallic friction coefficient and clutch anti-shudder performance, $R^{13}$ is preferably a hydroxyalkyl group.

X represents an oxygen atom or a sulfur atom, and is, from the viewpoint of improving intermetallic friction coefficient and clutch anti-shudder performance, preferably an oxygen atom. The amide compound (A) includes both an amide compound where X is an oxygen atom and a thioamide compound where X is a sulfur atom, but an amide compound where X is an oxygen atom is preferred.

More specifically, from the viewpoint of improving intermetallic friction coefficient and clutch anti-shudder performance, the amide compound (A) is preferably an amide compound of the general formula (1) where $R^{11}$ is a hydrocarbon group having 12 or more carbon atoms, $R^{12}$ is a hydrogen atom or a hydrocarbon group having 1 or more and 2 or less carbon atoms, $R^{13}$ is a hydroxyalkyl group having 1 or more and 6 or less carbon atoms, and X is an oxygen atom, more preferably an amide compound where $R^{11}$ is a hydrocarbon group having 12 or more carbon atoms, $R^{12}$ is a hydrogen atom, $R^{13}$ is a hydroxyalkyl group having 1 or more and 6 or less carbon atoms, and X is an oxygen atom, and even more preferably an amide compound where $R^{11}$ is a hydrocarbon group having 16 or more and 20 or less carbon atoms, $R^{12}$ is a hydrogen atom, $R^{13}$ is a hydroxyalkyl group having 1 or more and 2 or less carbon atoms, and X is an oxygen atom.

Further specifically, the amide compound (A) is preferably a monoalkylamide compound or a dialkylamide compound of the general formula (1) where $R^{11}$ is an alkyl group having 12 or more carbon atoms, $R^{12}$ is a hydrogen atom or an alkyl group having 1 or more and 2 or less carbon atoms, $R^{13}$ is a hydroxyalkyl group having 1 or more and 6 or less carbon atoms, and X is an oxygen atom, more preferably a monoalkylamide compound where $R^{11}$ is an alkyl group having 12 or more carbon atoms, $R^{12}$ is a hydrogen atom, $R^{13}$ is a hydroxyalkyl group having 1 or more and 6 or less carbon atoms, and X is an oxygen atom, and even more preferably a monoalkylamide compound where RH is an alkyl group having 16 or more and 20 or less carbon atoms, $R^{12}$ is a hydrogen atom, $R^{13}$ is a hydroxyalkyl group having 1 or more and 2 or less carbon atoms, and X is an oxygen atom.

The content of the amide compound (A) is, based on the total amount of the composition, preferably 0.15% by mass or more and 4% by mass or less, more preferably 0.2% by mass or more and 2% by mass or less, even more preferably 0.3% by mass or more and 1.5% by mass or less. When the content of the amide compound (A) falls within the above range, intermetallic friction coefficient and clutch anti-shudder performance can be improved.

For the same reason, the content of the amide compound (A) as converted in terms of nitrogen atom, based on the total amount of the composition, is preferably 50 ppm by mass or more and 1,800 ppm by mass or less, more preferably 85 ppm by mass or more and 850 ppm by mass or less, even more preferably 150 ppm by mass or more and 650 ppm by mass or less.

Among the amide compound (A), especially in the case of an amide compound (A) of the general formula (1) where $R^{12}$ is a hydrogen atom, the content of the amide compound (A) is, in consideration of the solubility thereof in the lubricating oil composition, preferably 0.15% by mass or more and 2% by mass or less based on the total amount of the composition, more preferably 0.2% by mass or more and 1.5% by mass or less, and even more preferably 0.25% by mass or more and 1% by mass or less.

For the same reason, in the case of an amide compound (A) of the general formula (1) where $R^{12}$ is a hydrogen atom, the content of the amide compound (A) as converted in terms of nitrogen atom is, based on the total amount of the composition, preferably 50 ppm by mass or more and 850 ppm by mass or less, more preferably 80 ppm by mass or more and 650 ppm by mass or less, and even more preferably 100 ppm by mass or more and 450 ppm by mass or less.

<(B) Metal-Based Detergent>

When used in combination with the amide compound (A), the metal-based detergent (B) may impart a high intermetallic friction coefficient and excellent clutch anti-shudder performance to the lubricating oil composition of the present embodiment. For example, the metal-based detergent (B) is preferably at least one selected from metal sulfonates, metal phenates and metal salicylates, and above all, metal sulfonates are preferred.

As the metal contained in the metal-based detergent (B), an alkali metal such as sodium and potassium, and an alkaline earth metal such as magnesium, calcium and barium are preferred; an alkaline earth metal such as magnesium, calcium and barium is more preferred; and calcium is even more preferred.

For example, the metal-based detergent (B) is preferably an alkali metal sulfonate, an alkali metal phenate or an alkali metal salicylate where the metal atom is an alkali metal, or an alkaline earth metal sulfonate, an alkaline earth metal phenate or an alkaline earth metal salicylate where the metal atom is an alkaline earth metal, more preferably an alkaline earth metal sulfonate, an alkaline earth metal phenate or an alkaline earth metal salicylate where the metal atom is an alkaline earth metal, even more preferably calcium sulfonate, calcium phenate or calcium salicylate where the alkaline earth metal is calcium, and especially preferably calcium sulfonate.

The metal-based detergent (B) may be neutral, basic or overbased, but for improving intermetallic friction coefficient and clutch anti-shudder performance and in consideration of detergency, basic and overbased ones are preferred, and the total base number thereof is preferably 10 mgKOH/g or more and 700 mgKOH/g or less, more preferably 100 mgKOH/g or more and 650 mgKOH/g or less, and even more preferably 200 mgKOH/g or more and 550 mgKOH/g or less. Here, the total base number is measured according to the perchloric acid method described in JIS K2501.

More specific examples of the metal-based detergent (B) include, as metal sulfonates, compounds represented by the following general formulae (2-1) to (2-3), as metal phenates, compounds represented by the following general formulae (3-1) to (3-3), and as metal salicylates, compounds represented by the following general formulae (4-1) to (4-3).

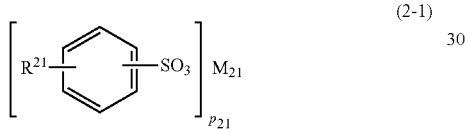
(2-1)

(2-2)

(2-3)

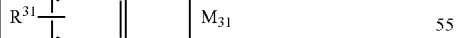
(3-1)

(3-2)

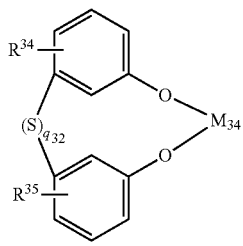
(3-3)

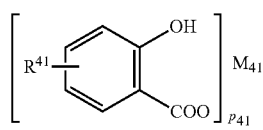
(4-1)

(4-2)

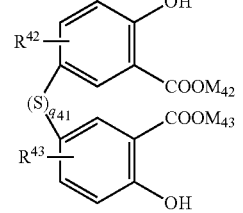

(4-3)

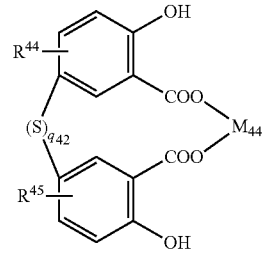

In the general formulae (2-1) to (2-3), (3-1) to (3-3) and (4-1) to (4-3), $R^{21}$ to $R^{25}$, $R^{31}$ to $R^{35}$, and $R^{44}$ to $R^{45}$ each independently represent a hydrogen atom or a hydrocarbon group having 1 or more and 24 or less carbon atoms, $M_{21}$, $M_{31}$, and $M_{41}$ each independently represent an alkali metal or an alkaline earth metal, $M_{22}$, $M_{23}$, $M_{32}$, $M_{33}$, $M_{42}$, and $M_{43}$ each independently represent an alkali metal, $M_{24}$, $M_{34}$, and $M_{44}$ each independently represent an alkaline earth metal, $p_{21}$, $p_{31}$ and $p_{41}$ each represent a valence of $M_{21}$, $M_{31}$ and $M_{41}$, respectively, $q_{21}$, $q_{22}$, $q_{31}$, $q_{32}$, $q_{41}$ and $q_{42}$ each represent 1 or 2. In the general formulae (2-1), (3-1) and (4-1), when plural $R^{21}$'s, $R^{31}$'s and $R^{41}$'s exist, $R^{21}$'s, $R^{31}$'s and $R^{41}$'s each may be the same or different.

Regarding the hydrocarbon group having 1 or more and 24 or less carbon atoms of $R^{21}$ to $R^{25}$, $R^{31}$ to $R^{35}$ and $R^{41}$ to $R^{45}$, reference may be made to those exemplified for the hydrocarbon group of $R^{11}$ and $R^{12}$ in the general formula (1) of the amide compound (A) described hereinabove.

Regarding $M_{21}$, $M_{31}$ and $M_{41}$ of the metal atom contained in these metal-based detergents, reference may be made to exemplifications of the alkali metal and the alkaline earth metal mentioned hereinabove; and regarding the alkali metal of $M_{22}$, $M_{23}$, $M_{32}$, $M_{33}$, $M_{42}$ and $M_{43}$, and the alkaline earth metal of $M_{24}$, $M_{34}$ and $M_{44}$, reference may also be made to exemplifications of the alkali metal and the alkaline earth metal mentioned hereinabove.

$p_{21}$, $p_{31}$ and $p_{41}$ each represent a valence of $M_{21}$, $M_{31}$ and $M_{41}$, respectively. For example, when $M_{21}$, $M_{31}$ and $M_{41}$ each are an alkali metal, $p_{21}$, $p_{31}$ and $p_{41}$ each are 1; and when $M_{21}$, $M_{31}$ and $M_{41}$ each are an alkaline earth metal, $p_{21}$, $p_{31}$ and $p_{41}$ each are 2.

The content of the metal-based detergent (B) as converted in terms of metal atom needs to be more than 300 ppm by mass and 1,000 ppm by mass or less, based on the total amount of the composition. When the content of the metal-based detergent (B) as converted in terms of metal atom is 300 ppm by mass or less and more than 1,000 ppm by mass, a high intermetallic friction coefficient and excellent clutch anti-shudder performance could not be obtained. From the viewpoint of improving intermetallic friction coefficient and clutch anti-shudder performance, the content of the metal-based detergent (B) as converted in terms of metal atom is, based on the total amount of the composition, preferably 325 ppm by mass or more and 900 ppm by mass or less, more preferably 350 ppm by mass or more and 800 ppm by mass or less, and even more preferably 400 ppm by mass or more and 700 ppm by mass or less.

From the same viewpoint, the content of the metal-based detergent (B) is, based on the total amount of the composition, preferably 0.1% by mass or more and 5% by mass or less, more preferably 0.15% by mass or more and 3% by mass or less, and even more preferably 0.2% by mass or more and 2% by mass or less.

<(C) Phosphate>

The lubricating oil composition of the present embodiment preferably further contains (C) at least one phosphate selected from an acid phosphate and an acid phosphite (hereinafter this may be simply referred to as "(C) phosphate"). When the phosphate (C) is contained, the effect of improving intermetallic friction coefficient can be obtained, and owing to the interaction with the other components, namely the amide compound (A) and the metal-based detergent (B), an intermetallic friction coefficient and clutch anti-shudder performance are improved.

Preferred examples of the acid phosphate include those represented by the following general formulae (5) and (6), and preferred examples of the acid phosphite include those represented by the following general formula (7) and (8).

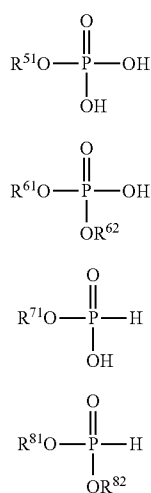

In the general formulae (5) to (8), $R^{51}$, $R^{61}$, $R^{62}$, $R^{71}$, $R^{81}$ and $R^{82}$ each independently represent a hydrocarbon group having 1 or more and 24 or less carbon atoms. The hydrocarbon group includes an alkyl group, an alkenyl group an alkadiene group, a cycloalkyl group, an aryl group and an arylalkyl group. Among these hydrocarbon groups, an alkyl group and an alkenyl group are preferred, and from the viewpoint of increasing the stability of the amide compound and attaining a more excellent effect, an alkyl group is more preferred. Regarding these hydrocarbon groups, reference may be made to the exemplifications of the hydrocarbon group of $R^{11}$ and $R^{12}$ in the general formula (1) of the amide compound (A) mentioned hereinabove.

From the viewpoint of improving interlayer friction coefficient and clutch anti-shudder performance, in the case where the hydrocarbon group is an alkyl group or an alkenyl group, the carbon number thereof is preferably 1 or more, more preferably 2 or more, even more preferably 4 or more, especially preferably 6 or more, and the upper limit is preferably 24 or less, more preferably 20 or less, even more preferably 14 or less, and especially preferably 12 or less. In the case where the hydrocarbon group is a cycloalkyl group or an aryl group, the carbon number thereof is preferably 6 or more, and the upper limit is preferably 16 or less, more preferably 14 or less, even more preferably 12 or less. When the hydrocarbon group is an arylalkyl group, the carbon number thereof is preferably 7 or more, and the upper limit is preferably 16 or less, more preferably 14 or less, even more preferably 12 or less.

Examples of the acid phosphate monoester represented by the general formula (5) include ethyl acid phosphate, propyl acid phosphate, butyl acid phosphate and ethylhexyl acid phosphate. Examples of the acid phosphate diester represented by the general formula (6) include diethyl acid phosphate, dipropyl acid phosphate, dibutyl acid phosphate, and diethylhexyl acid phosphate.

Among the above-mentioned acid phosphates, an acid phosphate monoester having an alkyl group having 6 or more and 8 or less carbon atoms is preferred from the viewpoint of improving intermetallic friction coefficient and clutch anti-shudder performance, an acid phosphate monoester having a branched alkyl group is more preferred, and an acid phosphate monoester having a branched alkyl group having 8 carbon atoms, namely, ethylhexyl acid phosphate is more preferred.

Examples of the acid phosphite monoester represented by the general formula (7) include ethyl hydrogenphosphite, propyl hydrogenphosphite, butyl hydrogenphosphite, and ethylhexyl hydrogenphosphite. Examples of the acid phosphite diester represented by the general formula (8) include dihexyl hydrogenphosphite, diheptyl hydrogenphosphite, dioctyl hydrogenphosphite, and diethylhexyl hydrogenphosphite.

Among the above-mentioned acid phosphites, acid phosphite monoesters having an alkyl group having 6 or more and 8 or less carbon atoms are preferred from the viewpoint of improving intermetallic friction coefficient and clutch anti-shudder performance, acid phosphite monoesters having a branched alkyl group are more preferred, and an acid phosphite monoester having a branched alkyl group having 8 carbon atoms, namely, ethylhexyl hydrogenphosphite is even more preferred.

The content of the phosphate (C) as converted in terms of phosphorus atom based on the total amount of the composition is preferably 100 ppm by mass or more, more preferably 150 ppm by mass or more, even more preferably 200 ppm by mass or more. The upper limit is preferably 1,000 ppm by mass or less, more preferably 800 ppm by mass or less, even more preferably 700 ppm by mass or less. When the content of the phosphate (C) falls within the above range, a high intermetallic friction coefficient and excellent clutch anti-shudder performance can be attained efficiently.

For the same reason as above, the content of the phosphate (C) based on the total amount of the composition is preferably 0.05% by mass or more, more preferably 0.1% by mass or more, even more preferably 0.15% by mass or more. The upper limit is preferably 2% by mass or less, more preferably 1.5% by mass or less, even more preferably 1% by mass or less.

<(D) Base Oil>

The lubricating oil composition of the present embodiment may further contain a base oil (D). The base oil (D) may be a mineral oil or a synthetic oil.

The mineral oil includes atmospheric residues obtained through atmospheric distillation of crude oils such as paraffin-base mineral oils, naphthene-base mineral oils or intermediate-base mineral oils; distillates obtained through reduced-pressure distillation of such atmospheric residues; mineral oils obtained by purifying the distillates through one or more purification treatments of solvent deasphalting, solvent extraction, hydrocracking, solvent dewaxing, catalytic dewaxing or hydrorefining, for example, light neutral oils, medium neutral oils, heavy neutral oils, and bright stocks; and mineral oils obtained by isomerizing wax produced through Fischer-Tropsch synthesis (GTL wax).

As the mineral oil, those grouped in any of Groups 1, 2 and 3 in the base oil category by API (American Petroleum Institute) may be used, but those grouped in Groups 2 and 3 are preferred from the viewpoint of more effectively preventing sludge formation of attaining good viscosity characteristics and stability against oxidation degradation.

Examples of the synthetic oil include poly-α-olefins such as polybutene, ethylene-α-olefin copolymers, and α-olefin homopolymers or copolymers; various esters such as polyol esters, dibasic acid esters, and phosphates; various ethers such as polyphenyl ethers; polyglycols; alkylbenzenes; and alkylnaphthalenes.

As the base oil (D), one of the above-mentioned mineral oils may be used alone or plural kinds thereof may be used in combination, or one of the synthetic oils may be used alone or plural kinds thereof may be used in combination. One or more kinds of mineral oils and one or more kinds of synthetic oils may be combined to give a mixed oil for use herein.

The viscosity of the base oil (D) is not specifically limited. Preferably, the kinematic viscosity thereof at 100° C. is 1.5 mm$^2$/s or more, more preferably 2 mm$^2$/s or more, even more preferably 2.5 mm$^2$/s or more. The upper limit is preferably 10 mm$^2$/s or less, more preferably 8 mm$^2$/s or less, even more preferably 5 mm$^2$/s or less. The kinematic viscosity at 40° C. of the base oil (D) is preferably 7 mm$^2$/s or more, more preferably 8 mm$^2$/s or more, even more preferably 10 mm$^2$/s or more. The upper limit is preferably 25 mm$^2$/s or less, more preferably 20 mm$^2$/s or less, even more preferably 15 mm$^2$/s or less. When the kinematic viscosity of the base oil (D) falls within the above range, fuel saving performance may be bettered and intermetallic friction coefficient and clutch anti-shudder performance can improve.

Also from the same viewpoint as above, the viscosity index of the base oil (D) is preferably 80 or more, more preferably 90 or more, even more preferably 100 or more. In this description, the kinematic viscosity and the viscosity index are values measured using a glass capillary viscometer according to JIS K 2283:2000.

The content of the base oil (D) based on the total amount of the composition is generally 50% by mass or more, preferably 60% by mass or more, more preferably 70% by mass or more, even more preferably 80% by mass or more. The upper limit is preferably 97% by mass or less, more preferably 95% by mass or less, even more preferably 90% by mass or less.

<Other Additives>

The lubricating oil composition of the present embodiment may contain, within a range not detracting from the object of the present invention, any other additives than the amide compound (A), the metal-based detergent (B), the phosphate (C), the base oil (D), and for example, any other additives such as a viscosity index improver, a friction modifier, a friction inhibitor, a dispersant, a metal deactivator, an anti-foaming agent, an antioxidant, and a flow point depressant may be suitably selected and blended in the composition. One alone of these additives may be used or plural kinds thereof may be used in combination. The lubricating oil composition of the present embodiment may be composed of the above-mentioned amide compound (A) and the metal-based detergent (B), or may be composed of the amide compound (A), the metal-based detergent (B), and further the phosphate (C) and the base oil (D) that are optionally contained therein, or may be composed of the amide compound (A), the metal-based detergent (B), the phosphate (C), the base oil (D) and other additives.

Falling within a range not conflicting with the advantageous effects of the present invention, the total content of the additives is not specifically limited but is, in consideration of the effect of the additives to be added, preferably 0.1% by mass or more and 20% by mass or less, more preferably 3% by mass or more and 18% by mass or less, and even more preferably 10% by mass or more and 17% by mass or less.

(Viscosity Index Improver)

The lubricating oil composition of the present embodiment may contain, for the purpose of improving the viscosity index of the lubricating oil composition, a viscosity index improver. Examples of the viscosity index improver include polymers such as a non-dispersant-type polymethacrylate, a dispersant-type polymethacrylate, an olefin-based copolymer (for example, an ethylene-propylene copolymer), a dispersant-type olefin-based copolymer, and a styrene-based copolymer (for example, a styrene-diene copolymer, a styrene-isoprene copolymer).

The mass-average molecular weight of the viscosity index improver may be suitably determined depending on the kind thereof, but is, from the viewpoint of viscosity characteristics, generally 500 or more and 1,000,000 or less, preferably 5,000 or more and 800,000 or less, more preferably 10,000 or more and 600,000 or less.

In the case of a non-dispersant-type or dispersant-type polymethacrylate, the mass-average molecular weight thereof is preferably 5,000 or more and 500,000 or less, more preferably 10,000 or more and 300,000 or less, and further more preferably 20,000 or more and 100,000 or less. In the case of an olefin-based copolymer, the mass-average molecular weight thereof is preferably 800 or more and 300,000 or less, more preferably 5,000 or more and 250,000 or less, even more preferably 10,000 or more and 200,000 or less.

In this description, the mass-average molecular weight is a value derived from the calibration curve drawn through gel permeation chromatography (GPC) using polystyrene. For example, the mass-average molecular weight of each polymer mentioned above may be calculated as converted in terms of polystyrene according to the GPC method mentioned below.

<GPC Measuring Apparatus>
Column: TOSO GMHHR-H(S)HT
Detector: RI detector for liquid chromatography, WATERS 150C
<Measurement Condition, etc.>
Solvent: 1,2,4-trichlorobenzene
Measurement temperature: 145° C.
Flow rate: 1.0 ml/min
Sample concentration: 2.2 mg/ml
Injection amount: 160 μl
Calibration curve: Universal Calibration
Analysis program: HT-GPC (Ver. 1.0)

The content of the viscosity index improver is, from the viewpoint of efficiently attaining the addition effect, preferably 0.5% by mass or more and 15% by mass or less based on the total amount of the composition, more preferably 1% by mass or more and 12% by mass or less, even more preferably 3% by mass or more and 10% by mass or less.

(Friction Modifier)

Examples of the friction modifier include ash-free friction modifiers such as aliphatic amines, aliphatic alcohols, fatty acid amines, fatty acid esters, fatty acid amides, fatty acids and fatty acid ethers having at least one alkyl or alkenyl group having 6 or more and 30 or less carbon atoms, especially a linear alkyl or alkenyl group having 6 or more and 30 or less carbon atoms in the molecule; and molybdenum-based friction modifiers such as molybdenum dithiocarbamate (MoDTC), molybdenum dithiophosphate (MoDTP), and molybdic acid amine salts.

In the case where an ash-free friction modifier is used, the content thereof is, from the viewpoint of efficiently attaining the addition effect, preferably 0.01% by mass or more based on the total amount of the composition, more preferably 0.05% by mass or more, even more preferably 0.1% by mass or more. The upper limit is preferably 3% by mass or less, more preferably 2% by mass or less, even more preferably 1.5% by mass or less. In the case where a molybdenum-based friction modifier is used, the content thereof as converted in terms of molybdenum atom is, based on the total amount of the composition, preferably 60 ppm by mass or more, more preferably 70 ppm by mass or more, even more preferably 80 ppm by mass or more. The upper limit is preferably 1,000 ppm by mass or less, more preferably 900 ppm by mass or less, even more preferably 800 ppm by mass or less.

(Friction Inhibitor)

Examples of the anti-wear agent include sulfur-based anti-wear agents such as metal thiophosphates (examples of metal: zinc (Zn), lead (Pb), antimony (Sb)) and metal thiocarbamates (examples of metal: zinc (Zn)), and phosphorus-based anti-wear agents such as phosphates (for example, tricresyl phosphate).

(Dispersant)

Examples of the dispersant include ash-free dispersants such as boron-free succinimides, boron-containing succinimides, benzylamines, boron-containing benzylamines, succinates, and mono or dicarboxylic acid amides of typically fatty acids or succinic acid.

(Metal Deactivator)

Examples of the metal deactivator include benzotriazole, triazole derivatives, benzotriazole derivatives, and thiadiazole derivatives.

(Anti-Foaming Agent)

Examples of the anti-foaming agent include silicone oils, fluorosilicone oils, and fluoroalkyl ethers.

(Antioxidant)

Examples of the antioxidant include amine-based antioxidants such as diphenylamine-based antioxidants, and naphthylamine-based antioxidants; phenol-based antioxidants such as monophenol-based antioxidants, diphenol-based antioxidants, and hindered phenol-based antioxidants; molybdenum-based antioxidants such as molybdenum amine complexes produced by reacting molybdenum trioxide and/or molybdic acid and an amine compound; sulfur-based antioxidants such as phenothiazine, dioctadecyl sulfide, dilauroyl-3,3'-thiodipropionate, and 2-mercaptobenzimidazole; and phosphorus-based antioxidants such as triphenyl phosphite, diisopropylmonophenyl phosphite, and monobutyldiphenyl phosphite.

(Pour Point Depressant)

Examples of the pour point depressant include ethylene-vinyl acetate copolymers, condensation products of chloroparaffin and naphthalene, condensation products of chloroparaffin and phenol, polymethacrylates, and polyalkylstyrenes.

(Various Physical Properties of Lubricating Oil Composition)

The kinematic viscosity at 100° C. of the lubricating oil composition of the present embodiment is preferably 1 $mm^2/s$ or more and 10 $mm^2/s$ or less, more preferably 2 $mm^2/s$ or more and 8 $mm^2/s$ or less, even more preferably 3 $mm^2/s$ or more and 7 $mm^2/s$ or less. The kinematic viscosity at 40° C. of the lubricating oil composition of the present embodiment is preferably 7 $mm^2/s$ or more and 30 $mm^2/s$ or less, more preferably 10 $mm^2/s$ or more and 27 $mm^2/s$ or less, even more preferably 15 $mm^2/s$ or more and 25 $mm^2/s$ or less. When the kinematic viscosity of the lubricating oil composition falls within the above range, the effect of improving intermetallic friction coefficient and clutch anti-shudder performance can be easy to attain.

Also from the same viewpoint as above, the viscosity index of the lubricating oil composition of the present embodiment is preferably 150 or more, more preferably 170 or more, even more preferably 190 or more.

The intermetallic friction coefficient of the lubricating oil composition of the present embodiment is preferably 0.115 or more, more preferably 0.117 or more, even more preferably 0.12 or more. The value intermetallic friction coefficient value is a value measured according to the method described in the section of Examples given hereinunder.

The initial clutch anti-shudder performance ($d\mu/dV$) of the lubricating oil composition of the present embodiment is preferably 0.09 or more, more preferably 0.091 or more, even more preferably 0.092 or more. The clutch anti-shudder lifetime is preferably 350 hours or more, more preferably 450 hours or more, even more preferably 550 hours or more. The values of the initial clutch anti-shudder performance ($d\mu/dV$) and the clutch anti-shudder lifetime are values measured according to the method described in the section of Examples given hereinunder.

As described above, the lubricating oil composition of the present embodiment has both a high intermetallic friction coefficient and excellent clutch anti-shudder performance.

Taking advantage of such characteristic properties thereof, the lubricating oil composition of the present embodiment can be favorably used as a lubricating oil composition for transmissions, for example, for manual transmissions, automatic transmissions or continuously variable transmissions to be mounted on gasoline vehicles, hybrid vehicles, electric vehicles and the like. Above all, it is favorable as a lubricating oil composition for continuously variable transmissions, especially for continuously variable transmissions equipped with a lock-up clutch often to cause shudder generation. In addition, the lubricating oil composition of the present embodiment may also be favorably used for other uses, for example, for internal combustion engines, hydraulic machines, turbines, compressors, working machines, cutting machines, gears, and machines equipped with liquid bearings or ball bearings.

[Lubrication Method and Transmission]

The lubrication method of the present embodiment is a lubrication method using the lubricating oil composition of the present embodiment described above. The lubricating oil composition for use in the lubrication method of the present embodiment has both a high intermetallic friction coefficient and excellent clutch anti-shudder performance. Accordingly, the lubrication method of the present embodiment is favorably used for transmissions such as manual transmissions, automatic transmissions or continuously variable transmissions to be mounted, for example, on gasoline vehicles, hybrid vehicles and electric vehicles, and above all, the lubrication method is favorably used for lubrication of continuously variable transmissions, especially continuously variable transmissions equipped with a lock-up clutch often to cause shudder generation. In addition, the lubrication method is also favorably used for other uses, for example, for lubrication of internal combustion engines, hydraulic machines, turbines, compressors, working machines, cutting machines, gears, and machines equipped with liquid bearings or ball bearings.

The transmission of the present embodiment uses the lubricating oil composition of the present embodiment. The transmission of the present embodiment uses the lubricating oil composition having both a high intermetallic friction coefficient and excellent clutch anti-shudder performance, and is therefore widely favorably applied to manual transmissions, automatic transmissions or continuously variable transmissions in various vehicles such as such as gasoline vehicles, hybrid vehicles and electric vehicles. Above all, the transmission is favorably used as a continuously variable transmission, especially as a continuously variable transmission equipped with a lock-up clutch often to cause shudder generation.

EXAMPLES

Next, the present invention is described in more detail with reference to Examples, but the present invention is not limited at all by these Examples.

Examples 1 to 4, Comparative Examples 1 to 7

Lubricating oil compositions were prepared at the blending ratio (% by mass) shown in Table 1. The resultant lubricating oil compositions were analyzed for the properties thereof according to the methods mentioned below and tested variously according to the methods mentioned below to evaluate the properties thereof. The evaluation results are shown in Table 1.

The properties of the lubricating oil compositions were measured and evaluated according to the methods mentioned below.

(1) Kinematic Viscosity

Kinematic viscosity at 40° C. and 100° C. was measured according to JIS K 2283:2000.

(2) Viscosity Index (VI)

Measured according to JIS K 2283:2000.

(3) Content of Nitrogen Atom

Measured according to JIS K 2609:1998.

(4) Content of Metal Atom

Measured according to JIS-5S-38-92.

(5) Content of Phosphorus Atom

Measured according to JIS-5S-38-92.

(6) Measurement of Intermetallic Friction Coefficient: LFW-1 Test

Using a block-on-ring tester (LFW-1) described in ASTM D2174, intermetallic friction coefficient was measured. Concrete test conditions are as follows.

Test tool:

Ring: Falex S-10 Test Ring (SAE4620 Steel)

Block: Falex H-60 Test Block (SAE01 Steel)

Test conditions:

Oil temperature: 110° C.

Load: 1176 N

Slip rate: At 1.0, 0.5, 0.25, 0.125 and 0.063 m/s in that order, the tool was maintained as such for 5 minutes.

Friction coefficient: Value measured for 30 seconds before change of slip rate.

(Preconditioning: oil temperature, 110° C.; load, 1176 N; slip rate, 1 m/s; time, 30 minutes)

(7) Initial Clutch Anti-Shudder Performance

According to JASO M349-2012, samples were tested under the following conditions, and the value of $d\mu/dV$ at 50 rpm is referred to as an index of initial clutch anti-shudder performance. A larger value means more excellent initial anti-shudder performance.

Friction material: cellulosic disc/steel plate

Oil amount: 150 mL

Performance measurement: Measured at oil temperature 40° C. after preconditioning operation.

(Preconditioning operation: oil temperature, 80° C.; surface pressure, 1 MPa; slip rate, 0.6 m/s; time, 30 minutes)

(8) Clutch Anti-Shudder Lifetime

Evaluated according to JASO M349-2012. Concrete test conditions are as follows.

Friction material: cellulosic disc/steel plate

Oil amount: 150 mL

Oil temperature: 120° C.

Slip rate: 0.9 m/s

Slip time: 30 minutes

Downtime: 1 minute

Performance measurement: Every other of 24 hours after the start of the test, μ-V characteristics were measured, and the time taken until the value of $d\mu/dV$ reached less than 0 was counted to be the clutch anti-shudder lifetime of the tested sample.

(Preconditioning operation: oil temperature, 80° C.; surface pressure, 1 MPa; slip rate, 0.6 m/s; time, 30 minutes)

TABLE 1

|  |  |  | Example | | | | Comparative Example | |
|---|---|---|---|---|---|---|---|---|
|  |  |  | 1 | 2 | 3 | 4 | 1 | 2 |
| Blending Formulation | (D) Base Oil | % by mass | balance | balance | balance | balance | balance | balance |
|  | (A) Amide Compound | % by mass | 0.5 | 0.5 | 0.5 | 0.5 | — | 0.5 |
|  | (B) Metal-based Detergent 1 | % by mass | 0.4 | 0.4 | — | 0.4 | 0.4 | — |
|  | (B) Metal-based Detergent 2 | % by mass | — | — | 0.5 | — | — | — |
|  | (C) Phosphate 1 | % by mass | 0.25 | — | 0.25 | — | 0.25 | 0.25 |
|  | (C) Phosphate 2 | % by mass | — | 0.25 | — | — | — | — |
|  | Amine Compound 1 | % by mass | — | — | — | — | — | — |
|  | Amine Compound 2 | % by mass | — | — | — | — | — | — |
|  | Amine Compound 3 | % by mass | — | — | — | — | — | — |
|  | Other Additives | % by mass | 15 | 15 | 15 | 15 | 15 | 15 |
|  | Total | % by mass | 100 | 100 | 100 | 100 | 100 | 100 |
|  | Content of amide compound (A) as converted in terms of nitrogen atom*1 | ppm by mass | 200 | 200 | 200 | 200 | — | 200 |
|  | Content of amine compound as converted in terms of nitrogen atom *2 | ppm by mass | — | — | — | — | — | — |
|  | Metal-based detergent (B) as converted in terms of metal atom *3 | ppm by mass | 600 | 600 | 600 | 600 | 600 | — |
|  | Content of phosphate (C) as converted in terms of phosphorus atom *4 | ppm by mass | 400 | 370 | 400 | — | 400 | 400 |
| Properties | 100° C. kinematic viscosity | mm$^2$/s | 5.5 | 5.5 | 5.5 | 5.5 | 5.5 | 5.5 |
|  | 40° C. kinematic viscosity | mm$^2$/s | 22 | 22 | 22 | 22 | 22 | 22 |
|  | Viscosity Index | — | 205 | 205 | 205 | 205 | 205 | 205 |
| Evaluation Results | Intermetallic Friction Coefficient | — | 0.123 | 0.121 | 0.122 | 0.117 | 0.122 | 0.111 |
|  | Initial Clutch Anti-Shudder Performance | — | 0.094 | 0.092 | 0.094 | 0.093 | 0.087 | 0.089 |
|  | Clutch Anti-Shudder Lifetime | hr | 564 | 588 | 564 | 567 | 48 | 636 |

|  |  |  | Comparative Example | | | | |
|---|---|---|---|---|---|---|---|
|  |  |  | 3 | 4 | 5 | 6 | 7 |
| Blending Formulation | (D) Base Oil | % by mass | balance | balance | balance | balance | balance |
|  | (A) Amide Compound | % by mass | — | — | — | — | — |
|  | (B) Metal-based Detergent 1 | % by mass | 0.4 | 0.4 | 0.4 | 0.4 | — |
|  | (B) Metal-based Detergent 2 | % by mass | — | — | — | — | — |
|  | (C) Phosphate 1 | % by mass | 0.25 | 0.25 | — | — | 0.25 |
|  | (C) Phosphate 2 | % by mass | — | — | 0.25 | — | — |
|  | Amine Compound 1 | % by mass | 0.05 | — | 0.05 | 0.05 | — |
|  | Amine Compound 2 | % by mass | — | 0.03 | — | — | — |
|  | Amine Compound 3 | % by mass | 0.4 | 0.4 | 0.4 | 0.4 | 0.4 |
|  | Other Additives | % by mass | 15 | 15 | 15 | 15 | 15 |
|  | Total | % by mass | 100 | 100 | 100 | 100 | 100 |
|  | Content of amide compound (A) as converted in terms of nitrogen atom*1 | ppm by mass | — | — | — | — | — |
|  | Content of amine compound as converted in terms of nitrogen atom *2 | ppm by mass | 214 | 212 | 214 | 214 | 188 |
|  | Metal-based detergent (B) as converted in terms of metal atom *3 | ppm by mass | 600 | 600 | 600 | 600 | — |
|  | Content of phosphate (C) as converted in terms of phosphorus atom *4 | ppm by mass | 400 | 400 | 370 | — | 400 |
| Properties | 100° C. kinematic viscosity | mm$^2$/s | 5.5 | 5.5 | 5.5 | 5.5 | 5.5 |
|  | 40° C. kinematic viscosity | mm$^2$/s | 22 | 22 | 22 | 22 | 22 |
|  | Viscosity Index | — | 205 | 205 | 205 | 205 | 205 |
| Evaluation Results | Intermetallic Friction Coefficient | — | 0.122 | 0.121 | 0.122 | 0.109 | 0.108 |
|  | Initial Clutch Anti-Shudder Performance | — | 0.096 | 0.097 | 0.096 | 0.092 | 0.088 |
|  | Clutch Anti-Shudder Lifetime | hr | 348 | 348 | 336 | 312 | 312 |

*1 Content of the amide compound (A) as converted in terms of nitrogen atom (based on the total amount of the composition)
*2 Content of the amine compounds 1 to 3 as converted in terms of nitrogen atom (based on the total amount of the composition)
*3 Content of the metal-based detergent (B) as converted in terms of metal atom (based on the total amount of the composition)
*4 Content of the phosphate (C) as converted in terms of phosphorus atom (based on the total amount of the composition)

Details of the components shown in Table 1 used in these Examples are as follows.

(D) Base oil: 70 N mineral oil (100° C. kinematic viscosity: 3.1 mm$^2$/s, 40° C. kinematic viscosity: 12.5 mm$^2$/s, viscosity index 110)
(A) Amide compound: monostearyl-glycolic acid amide (amide compound of the general formula (1) where $R^{11}$ is an octadecyl group, $R^{12}$ is a hydrogen atom, $R^{13}$ is a hydroxymethyl group, and X is an oxygen atom)
(B) Metal-based detergent 1: calcium sulfonate (base number: 450 mgKOH/g, calcium content; 15% by mass)
(B) Metal-based detergent 2: calcium sulfonate (base number: 300 mgKOH/g, calcium content; 12% by mass)
(C) Phosphate 1: 2-ethylhexyl hydrogenphosphite (acid phosphite, acid phosphite monoester of the general formula (7) where $R^{71}$ is a 2-ethylhexyl group)
(C) Phosphate 2: 2-ethylhexyl acid phosphate (acid phosphate, acid phosphate monoester of the general formula (5) where $R^{51}$ is a 2-ethylhexyl group)
Amine compound 1: oleylamine
Amine compound 2: stearylpropylenediamine
Amine compound 3: dimethyloctadecylamine
Other additives: (additive package) containing viscosity index improver (non-dispersant-type polymethacrylate, mass-average molecular weight: 30,000), friction inhibitor (tricresyl phosphate, sulfur-based), friction modifier (fatty acid ester), dispersant (polybutenylsuccinimide), metal deactivator (thiadiazole-based), anti-foaming agent (silicone-based)

From the results in Table 1, it is confirmed that the lubricating oil compositions of Examples 1 to 4 have both a high intermetallic friction coefficient and excellent clutch anti-shudder performance. Examples 1 and 4 are compared, and it is confirmed that addition of the phosphate (C) improves the intermetallic friction coefficient while maintaining the clutch anti-shudder performance as such.

On the other hand, the lubricating oil composition of Comparative Example 1 not containing the amide compound (A) is poor in initial clutch anti-shudder performance and has a short clutch anti-shudder lifetime, that is, the composition is poor in clutch anti-shudder performance; and the lubricating oil composition of Comparative Example 2 not containing the metal-based detergent (B) has a long clutch anti-shudder lifetime but has a low intermetallic friction coefficient, and the initial clutch anti-shudder performance thereof is low. In addition, it is confirmed that the lubricating oil compositions of Comparative Examples 3 to 6 containing an amine compound in place of the amide compound (A) have improved in point of the initial clutch anti-shudder performance as compared with the lubricating oil composition of Comparative Example 1, but could not be still said to be sufficient in point of the clutch anti-shudder lifetime when compared with the lubricating oil compositions of Examples; and that the lubricating oil composition of Comparative Example 7 not containing the amide compound (A) and the metal-based detergent (B) has a low intermetallic friction coefficient and is poor in initial clutch anti-shudder performance, and the clutch anti-shudder lifetime thereof is short.

From the results of Examples and Comparative Examples as mentioned above, it is confirmed that the lubricating oil composition of the present embodiment has a specific composition containing the amide compound (A) and a predetermined amount of the metal-based detergent (B), and preferably containing the phosphate (C), and therefore has both a high intermetallic friction coefficient and excellent clutch anti-shudder performance, and that, when any one of these is absent, the composition could not have a high intermetallic friction coefficient and excellent clutch anti-shudder performance.

INDUSTRIAL APPLICABILITY

The lubricating oil composition of the present embodiment has characteristics of satisfying both a high intermetallic friction coefficient and excellent clutch anti-shudder performance, and is therefore favorably used as a lubricating oil compositions for transmissions such as manual transmissions, automatic transmissions or continuously variable transmissions to be mounted on gasoline vehicles, hybrid vehicles, electric vehicles and the like. In particular, the lubricating oil composition is favorably used for continuously variable transmissions equipped with a lock-up clutch often to cause shudder generation.

The invention claimed is:
1. A lubricating oil composition, comprising:
(A) an amide compound of the following formula (1):

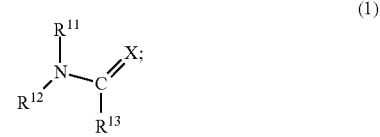

(B) a metal-based detergent, and
from 3 to 10% by mass of a viscosity index improver,
wherein:
the metal-based detergent (B) is a calcium sulfonate having a total base number of from 100 mgKOH/g to 700 mgKOH/g;
a content of the metal-based detergent (B), as converted in terms of a metal atom, is from more than 300 ppm by mass to 800 ppm by mass, based on the total amount of the composition;
$R^{11}$ is a hydrocarbon group having 6 or more carbon atoms,
$R^{12}$ is a hydrogen atom,
$R^{13}$ represents is a hydroxyalkyl group having from 1 to 6 carbon atoms, or a group formed by condensation of the hydroxyalkyl group with an acylating agent, and
X is an oxygen atom or a sulfur atom, and
wherein a content of the amide compound (A) is 1% by mass or less, based on the total amount of the composition.

2. The lubricating oil composition according to claim 1, wherein:
$R^{11}$ is a hydrocarbon group having 12 or more carbon atoms,
$R^{13}$ is a hydroxyalkyl group having from 1 to 6 carbon atoms, and
X is an oxygen atom.

3. The lubricating oil composition according to claim 1, wherein:
$R^{11}$ is an alkyl group having 12 or more carbon atoms,
$R^{13}$ is a hydroxyalkyl group having from 1 to 6 carbon atoms, and
X is an oxygen atom.

4. The lubricating oil composition according to claim 1, further comprising:
(C) at least one phosphate selected from the group consisting of an acid phosphate and an acid phosphite.

5. The lubricating oil composition according to claim 4, wherein a content of the phosphate (C), as converted in terms of a phosphorus atom, is 100 ppm by mass or more based on the total amount of the composition.

6. The lubricating oil composition according to claim 1, which is a lubricating oil composition for transmissions.

7. The lubricating oil composition according to claim 1, which is a lubricating oil composition for continuously variable transmissions.

8. A lubrication method, comprising lubricating a devise with the lubricating oil composition of claim 1.

9. A transmission, comprising the lubricating oil composition of claim 1.

10. The lubricating oil composition according to claim 1, wherein the content of the metal-based detergent (B), as converted in terms of a metal atom, is from 325 ppm by mass to 800 ppm by mass, based on the total amount of the composition.

* * * * *